United States Patent
Rydbeck et al.

(10) Patent No.: US 6,320,843 B1
(45) Date of Patent: Nov. 20, 2001

(54) WIRELESS COMMUNICATIONS SYSTEMS WITH STANDARD AND ROBUST SERVICES AND METHODS OF OPERATION THEREOF

(75) Inventors: Nils Rydbeck; Barbara Molnar, both of Cary; Jiann-Ching Guey, Durham; Ali Khayrallah; R. David Koilpillai, both of Apex, all of NC (US)

(73) Assignee: Ericsson Inc., Research Triangle Park, IL (US)

( * ) Notice: Subject to any disclaimer, the term of this patent is extended or adjusted under 35 U.S.C. 154(b) by 0 days.

(21) Appl. No.: 09/193,261

(22) Filed: Nov. 18, 1998

(51) Int. Cl.$^7$ .................................................. H04J 11/00
(52) U.S. Cl. .......................... 370/207; 370/209; 370/337
(58) Field of Search .................................... 370/208, 209, 370/225, 228, 241, 252, 329, 330, 333, 336, 337, 345, 347, 204, 206, 207; 455/466, 67.1, 67.3, 67.6, 115; 375/262, 261, 298, 324, 325, 341

(56) References Cited

U.S. PATENT DOCUMENTS

| | | | |
|---|---|---|---|
| 4,447,903 | 5/1984 | Sewerinson | 371/68 |
| 4,495,619 | 1/1985 | Acampora | 370/104 |
| 4,868,758 | 9/1989 | Kokubu | 705/400 |

(List continued on next page.)

FOREIGN PATENT DOCUMENTS

| | | |
|---|---|---|
| 0 817 397 A1 | 1/1998 | (EP) . |
| 0 838 964 A2 | 4/1998 | (EP) . |
| WO 98/31165 | 7/1998 | (WO) . |
| WO 98/33346 | 7/1998 | (WO) . |

OTHER PUBLICATIONS

W.T. Webb, "QAM: the modulation scheme for future mobile radio communications?," Electronics & Communication Engineering Journal, Aug. 1992, pp. 167–176.

(List continued on next page.)

*Primary Examiner*—Ricky Ngo
(74) *Attorney, Agent, or Firm*—Myers Bigel Sibley & Sajovec

(57) ABSTRACT

In a wireless communications system, information is communicated over one of a first communications channel having a first redundancy level or a second communications channel having a second redundancy level based on a determination of communications quality for at least one of the channels. In embodiments of the present invention, communications occur over a first channel, e.g., a "standard" channel until a measure of communications quality for that channel, such as bit error rate or frame error rate, meets a predetermined criterion. When the communications quality meets the predetermined criterion, communications shifts to a "robust" high-penetration channel that utilizes substantially the same amount of spectral resource as the first channel but provides significantly increased redundancy. In other embodiments, a terminal, e.g., a cellular radiotelephone or other radio terminal, registers with a wireless communications system via one of a standard broadcast control channel or a high-penetration broadcast control channel, and switches therebetween based upon a determination of communications quality for the standard broadcast control channel. For example, the terminal may switch to the high-penetration broadcast control channel upon failure to acquire the standard broadcast control channel in a disadvantaged reception area.

53 Claims, 12 Drawing Sheets

U.S. PATENT DOCUMENTS

| | | | | |
|---|---|---|---|---|
| 5,065,393 | | 11/1991 | Sibbitt et al. | 370/360 |
| 5,204,874 | * | 4/1993 | Falconer et al. | 375/200 |
| 5,303,297 | | 4/1994 | Hillis | 455/406 |
| 5,313,653 | | 5/1994 | Sasuta | 455/17 |
| 5,341,401 | | 8/1994 | Farjh et al. | 375/94 |
| 5,450,453 | * | 9/1995 | Frank | 375/200 |
| 5,465,398 | | 11/1995 | Flammer | 455/69 |
| 5,608,446 | | 3/1997 | Carr et al. | 348/6 |
| 5,612,948 | | 3/1997 | Fette et al. | 379/252 |
| 5,621,737 | | 4/1997 | Bucher | 371/5.1 |
| 5,625,877 | | 4/1997 | Dunn et al. | 455/454 |
| 5,657,325 | | 8/1997 | Lou et al. | 370/344 |
| 5,664,006 | | 9/1997 | Monte et al. | 455/405 |
| 5,666,649 | | 9/1997 | Dent | 455/445 |
| 5,751,799 | | 5/1998 | Mori | 379/114 |
| 5,754,599 | | 5/1998 | Ling et al. | 375/340 |
| 5,828,737 | | 10/1998 | Sawyer | 379/114 |
| 5,884,170 | | 3/1999 | Valentine et al. | 455/433 |
| 5,898,736 | | 4/1999 | Saito et al. | 375/316 |
| 5,909,434 | | 6/1999 | Odenwalder et al. | 370/342 |
| 5,946,356 | * | 8/1999 | Felix | 375/295 |
| 5,946,670 | | 8/1999 | Motohashi et al. | 705/400 |
| 5,966,384 | * | 10/1999 | Felix et al. | 370/465 |
| 5,987,076 | | 11/1999 | Zehavi et al. | 375/340 |
| 6,097,937 | | 8/2000 | Sawyer | 455/406 |
| 6,148,208 | * | 11/2000 | Love | 455/442 |
| 6,154,643 | | 11/2000 | Cox | 455/406 |
| 6,188,885 | | 2/2001 | Kolev et al. | 455/413 |

OTHER PUBLICATIONS

Giuliano Benelli, "Two New Coding Techniques for Diversity Communication Systems," IEEE Transactions on Communications, Sep. 1990, No. 9, New York, US, pp. 1530–1538.

International Search Report, PCT/US99/21128, Jan. 17, 2000.

International Search Report, PCT/US99/21463, Feb. 21, 2000.

Matthews, Adrian, "Application of IS–136 to Personal Communication Services," IEEE Publication Date: Apr. 30, 1996, pp. 223–228.

International Search Report, PCT/US00/07105, Jul. 6, 2000.

International Search Report, PCT/US00/08279, Aug. 1, 2000.

* cited by examiner

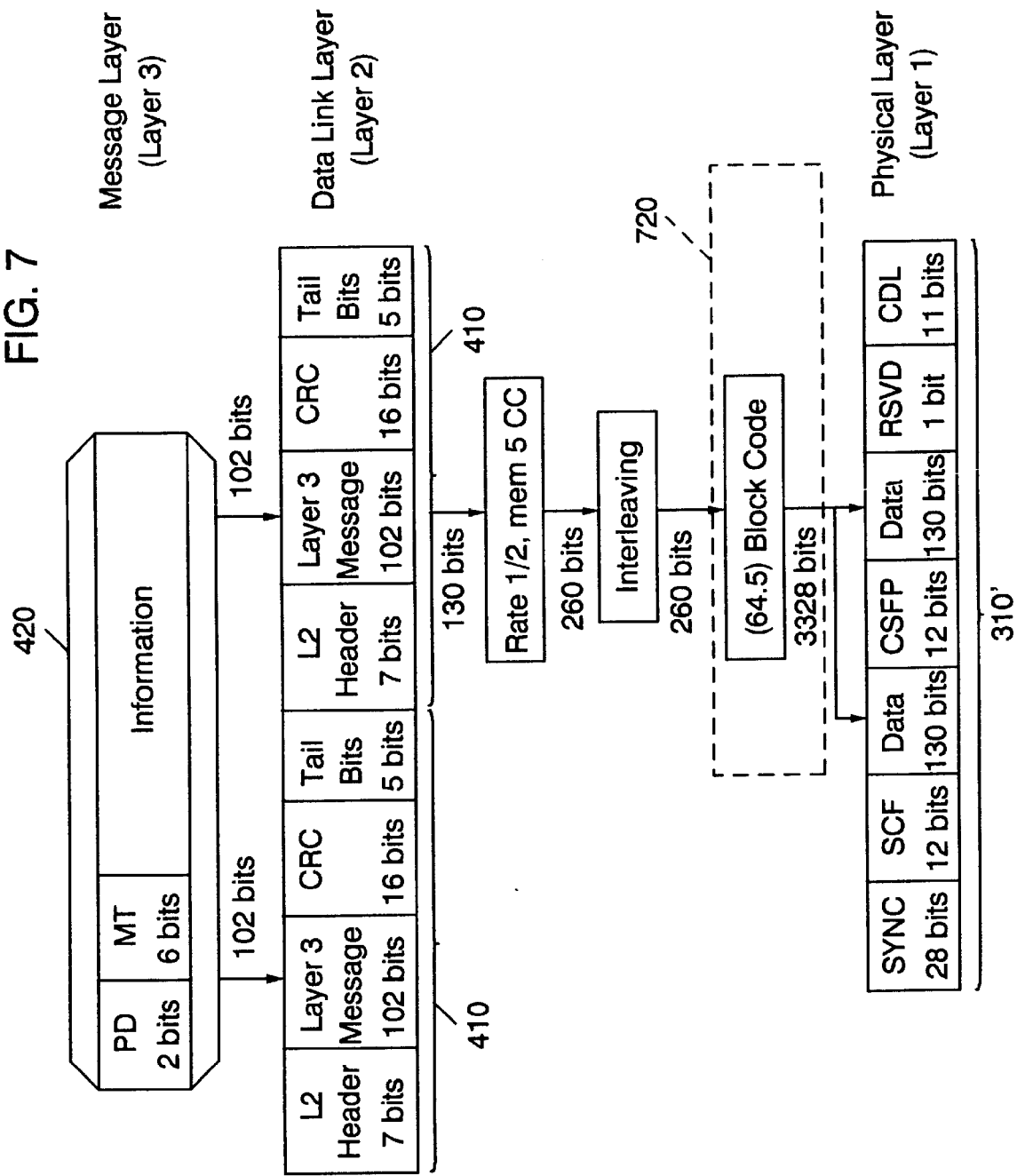

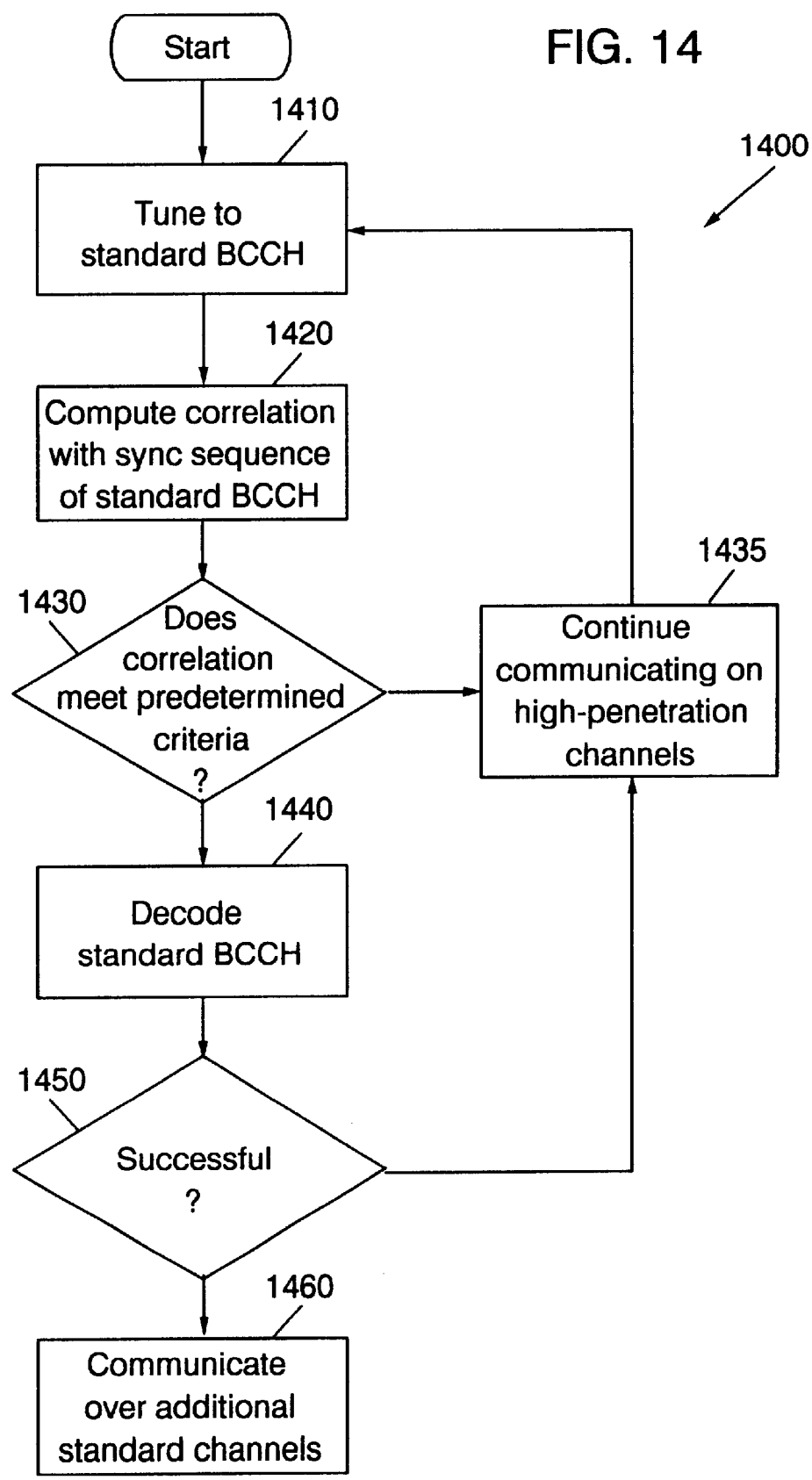

WIRELESS COMMUNICATIONS SYSTEMS WITH STANDARD AND ROBUST SERVICES AND METHODS OF OPERATION THEREOF

RELATED APPLICATION

The present application is related to a United States Patent Application entitled "Apparatus and Methods for Providing High-Penetration Messaging in Wireless Communications Systems," assigned to the assignee of the present invention, filed concurrently herewith, and incorporated herein by reference in its entirety.

FIELD OF THE INVENTION

The present invention relates to communications systems and methods, and more particularly, to wireless communications systems and methods.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have been long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook,* edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Traditional analog cellular systems generally employ a system referred to as frequency division multiple access (FDMA) to create communications channels. As a practical matter well known to those skilled in the art, radiotelephone communications signals, being modulated waveforms, typically are communicated over predetermined frequency bands in a spectrum of carrier frequencies. In a typical FDMA system, each of these discrete frequency bands serves as a channel over which cellular radiotelephones communicate with a cell, through the base station or satellite serving the cell.

The limitations on the available frequency spectrum present several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of channels available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system having only several hundred allocated frequency bands.

Another technique which can further increase channel capacity and spectral efficiency is the use of time division multiple access (TDMA). A TDMA system may be implemented by subdividing the frequency bands employed in conventional FDMA systems into sequential time slots. Communications over a frequency band typically occur on a repetitive TDMA frame structure that includes a plurality of time slots. Examples of systems employing TDMA are those conforming to the dual analog/digital IS-54B standard employed in the United States, in which each of the frequency bands of the traditional analog cellular spectrum are subdivided into 3 time slots, and systems conforming to the GSM standard, which divides each of a plurality of frequency bands into 8 time slots. In these TDMA systems, each user communicates with the base station using bursts of digital data transmitted during the user's assigned time slots.

A channel in a TDMA system typically includes at least one time slot on at least one frequency band. As discussed above, channels are used to communicate voice, data or other information between users, for example, between a radiotelephone and a landline telephone. Channels may be assigned to predetermined slots of predetermined frequency bands, as in the case of dedicated control channels. Included in the typical set of dedicated control channels transmitted in a cell are forward control channels which are used to broadcast control information in a cell of the radiotelephone system to radiotelephones which may seek to access the system. The control information broadcast on a forward control channel may include such things as the cell's identification, associated network identification, system timing information and other information needed to access the radiotelephone system from a radiotelephone.

Channels in a TDMA system may also be dynamically assigned by the system when and where needed. In addition, some systems, such as those conforming to the GSM standard, "frequency hop" traffic channels, i.e., change the frequency band on which a particular traffic channel is transmitted on a frame-by-frame basis. Frequency hopping can reduce the probability of interference events between channels by reducing the likelihood that the same two stations will use the same frequency at the same time. This can help provide for communications quality related to average instead of worst case interference.

Instead of or in addition to FDMA and TDMA techniques, wireless communications systems may employ Code Division Multiple Access (CDMA) or "spread spectrum" techniques. In a CDMA system, a channel is defined by modulating a data-modulated carrier signal by a unique spreading code, i.e., a code that spreads an original data-modulated carrier over a wide portion of the frequency spectrum in which the communications system operates. The transmitted signal is demodulated by a receiver unit using the same spreading code using signal correlation techniques. Because the transmitted signal is spread across a wide bandwidth, CDMA communications can be less vulnerable to coherent noise sources which might "jam" other communications signals. The use of the unique spreading code allows several channels to effectively share the same bandwidth.

The quality of service provided by a wireless communications systems such as cellular systems is subject to environmental effects. For example, a cellular radiotelephone call placed under system operating parameters that are designed to produce an acceptable level of communications quality under a set of nominal environmental conditions can be disrupted under "sub-nominal" conditions by fading, shadowing by intervening objects such as hills, and attenuation by distance and by structures such as buildings. Such environmental factors can result in service outages.

An example of such a service disruption occurs when a mobile radiotelephone enters an outage region of a cellular radiotelephone system. Such a region might include a hole in cellular coverage between cells, or an area of degraded reception or transmission within a cell, such as the interior of a building or a tunnel. When the mobile radiotelephone enters such a disadvantaged location, it may be unable to continue a call in progress, to receive notification of an incoming call, or to place an outgoing call.

A wireless communications system can be designed to reduce service disruptions by simply increasing transmit power. Increasing transmit power can be problematic, however, as increasing transmit power can lead to increased inter-channel interference. This can be particularly true in CDMA systems, in which it is generally desirable to balance signal power. In addition, increasing transmit power tends to be impractical for mobile units, as these units typically are power-limited due to size and battery constraints.

In cellular systems, another approach to reducing service outages is to increase the density of cells, i.e., of base stations, so that areas falling between cells are reduced. This approach, however, can lead to increased network complexity, along with increased capital and operational costs associated with the need for additional base stations.

Another approach for providing improved service to subscriber units in disadvantaged locations is to provide a selective high-power paging system that can inform a unit of an incoming call even when the unit is in a disadvantage location. In such a system, a base station sends a paging message to a disadvantaged unit over a specially designated high power channel. The paged unit can then moved to a less disadvantaged location in order to answer the page.

Although this approach can provide high-penetration notifications, this approach generally supports only a small number of users at any given time, as the system is still constrained by the interference concerns described above. Moreover, it may be impractical for a receiving unit to acknowledge such high-power messages while in disadvantaged locations. U.S. Pat. application Ser. No. 08/989,088, assigned to the assignee of the present application, describes a technique for responding to a high-power message which involves sending a simplified acknowledgement comprising a series of binary "1s" over a normal-power channel. However, the information that the mobile unit can transmit according to this technique may be limited.

SUMMARY OF THE INVENTION

In light of the foregoing, it is an object of the present invention to provide wireless communications systems and methods that can provide for reduce service outage.

It is another object of the present invention to provide wireless communications systems and methods for providing communications to subscriber units located in disadvantaged service areas.

It is another object of the present invention to provide more robust communications systems and methods for communicating with subscriber units in disadvantaged service areas without requiring increased transmit power or increased bandwidth usage.

It is yet another object of the present invention to provide apparatus and methods for providing more robust communications with subscriber units in a wireless communications system without requiring drastic modifications to the wireless communications system.

These and other objects, features and advantages are provided according to the present invention by wireless communications apparatus and methods in which information is communicated over one of a first communications channel having a first redundancy level or a second communications channel having a second redundancy level based on a determination of communications quality for at least one of the channels. In embodiments of the present invention, communications occur over a first channel, e.g., a "standard" channel until a measure of communications quality for that channel, such as received signal strength, bit error rate, or frame error rate, meets a predetermined criterion. When the communications quality meets the predetermined criterion, communications shifts to a "robust" high-penetration channel that utilizes substantially the same amount of spectral resource as the first channel but provides significantly increased redundancy. In other embodiments, a terminal, e.g., a cellular radiotelephone or other radio terminal, registers with a wireless communications system via one of a standard broadcast control channel or a high-penetration broadcast control channel, and switches therebetween based upon a determination of communications quality for the standard broadcast control channel. For example, the terminal may switch to the high-penetration broadcast control channel upon failure to acquire the standard broadcast control channel in a disadvantaged reception area.

By providing apparatus and methods for switching between standard and robust high-penetration messaging services, the present invention can help reduce service outages associated with positioning in disadvantaged reception areas such as the interiors of buildings and areas near the periphery of wireless cells. Because transmit power and bandwidth do not have to be increased for robust, high-penetration services, the interference and power problems described above can be avoided. Because increased transmit power is not required for high-penetration messaging, the present invention can be practically implemented in either base stations or terminals. The additional high-penetration messaging can be implemented with minimal changes to existing hardware and protocols.

In particular, according to the present invention, in a wireless communications system, a measure of quality of communications, e.g., a signal strength, a frame error rate or a bit error rate, is determined for at least one of a first communications channel having a first redundancy level associated therewith and a second communications channel having a second redundancy level associated therewith, the second redundancy level different than the first redundancy level. Communications occur over one of the first communications channel or the second communications channel selected based on the determined measure of communications quality. The first and second redundancy levels are preferably different, to provide "standard" and "robust" service capabilities.

According to an aspect of the present invention, determination of communications quality over the first channel occurs after communicating over the first communications channel. Communications subsequently occur over the second communications channel if the determined measure of communications quality for the first communications channel meets a predetermined criterion. For example, the determination of communications quality may be detection of a failure to successfully communicate over the first communications channel, in response to which communications are switched to the second communications channel.

In an embodiment of the present invention, a wireless terminal attempts to acquire a first, "standard" broadcast control channel. An attempt to acquire a second, "robust" broadcast control channel may follow, responsive to a failure to acquire the first broadcast control channel. The attempt to acquire the first broadcast control channel may occur, for example, upon emergence from a sleep mode of a wireless terminal.

According to other aspects of the present invention, communication over the first communications channel and communication over the second communications channel use substantially the same amount of spectral resource. For example, communications over the first and second communications channels may utilize substantially the same transmit power, bandwidth and/or transmission rate.

According to yet another aspect of the present invention, a carrier is modulated according to one of a first modulation scheme or a second modulation scheme to produce a modulated communications signal, wherein the second modulation scheme utilizes a constellation representing a subset of the first modulation scheme. The modulated communications signal is transmitted over one of the first communications channel or the second communications channel and is received on one of the first communications channel or the second communications channel. The received communications signal is demodulated according to one of the first modulation scheme or the second modulating scheme based on whether the received communications signal is received on the first communications channel or the second communications channel. For example, the received communications signal may be coherently demodulating if is received on the first communications channel and non-coherently demodulated if it is received on the second communications channel.

Related apparatus are also discussed. Wireless communications with multi-service capabilities are thereby provided.

BRIEF DESCRIPTION OF THE DRAWINGS

FIG. 7 illustrates an exemplary protocol stack for high penetration messaging.

FIGS. 10–14 illustrate exemplary operations for switching between standard and robust services according to aspects of the present invention.

DETAILED DESCRIPTION OF EMBODIMENTS

Figure 1:
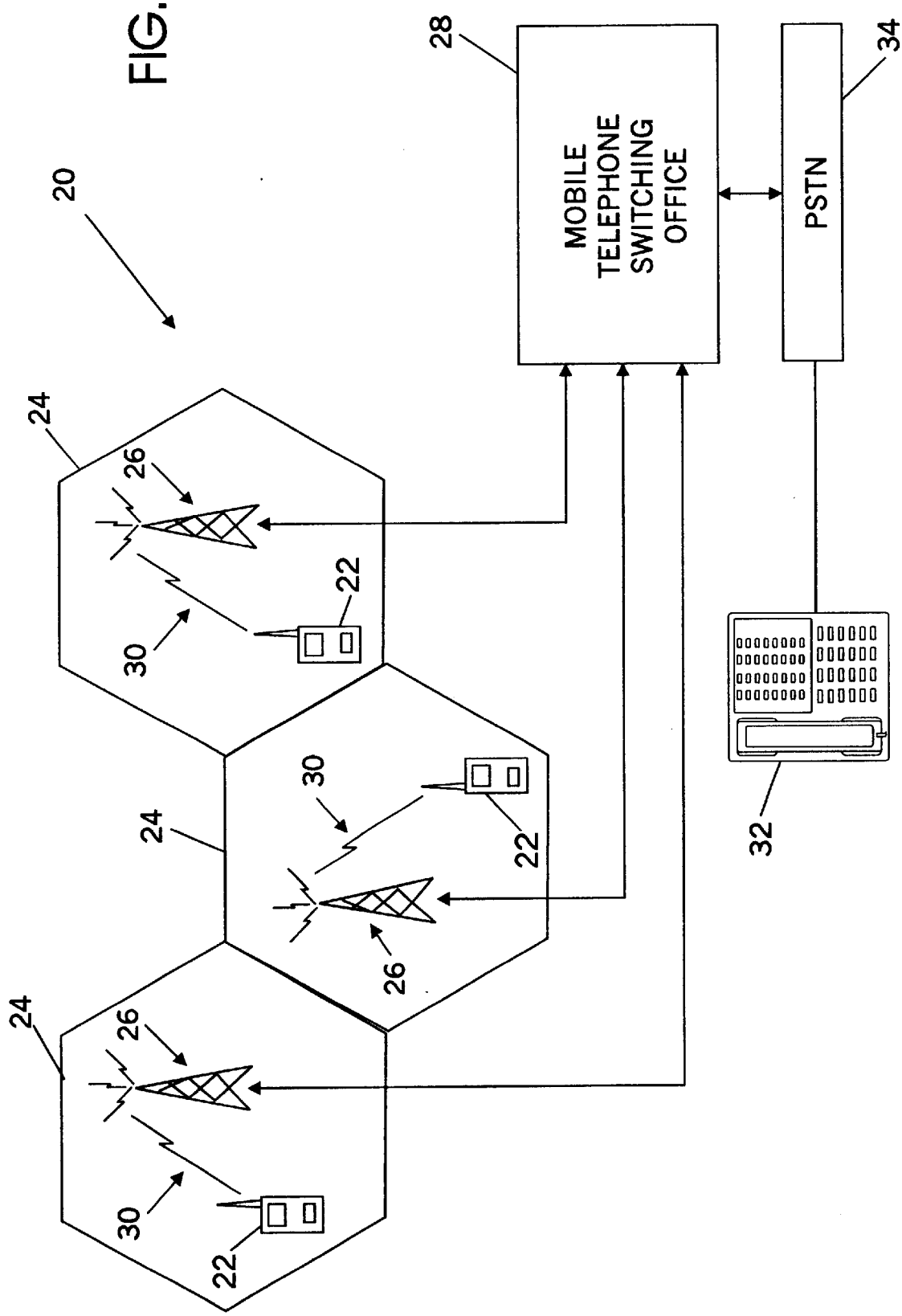
FIG. 1 illustrates a conventional terrestrial cellular radiotelephone communications system.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention relates to communication over channels in wireless communications systems such as cellular radiotelephone systems. As those skilled in the art will appreciate, terms such as "channel" are not always consistently used in the literature; for example, the *IEEE Standard Dictionary of Electrical Terms* defines a "channel" as both a communications path and a band of frequencies. In a conventional FDMA system, for example, a "channel" may refer or corresponds to a "physical" channel comprising a band of frequencies occupied by a modulated carrier. In a TDMA system such as GSM, a physical channel may comprise a group of time slots on one or more frequency bands, for example, the periodic time slots on particular frequency bands that are allocated to the so-called "common channels." In some contexts, a channel may be a "logical" channel defined by an addressing or field assignment scheme that may have no particular correlation to the frequency or time of transmission. For purposes of the present application, "channel" refers to a communications path defined in a communications interface such as the air interface of a wireless communications system, whether it be an actual physical channel comprising a frequency band, a time slice thereof, or the like, or a logical channel carried by such a physical channel.

"Frequency band" as used herein refers to a frequency range over which a communications signal, e.g., a modulated carrier signal, is distributed. This band may be, but need not necessarily be, centered about a central carrier frequency. Those skilled in the art will appreciate that the carrier frequency bands described herein need not be non-overlapping or contiguous; for example, modulated carriers typically may overlap in their spectral distributions without producing unacceptable levels of interference. In fact, in some systems the overlap may be sizable.

The embodiments discussed herein relate to a wireless communications system in which "short messages," e.g., alphanumeric messages such as those conforming to standards such a GSM or IS-136, are transmitted on at least one of a "standard" communications channel having a first channel coding that produces a first redundancy level or a "robust" high penetration communications channel having a second channel coding that produces a second redundancy level that is greater than the first redundancy level. In this manner, a system with standard and robust service capabilities can be implemented.

Those skilled in the art will appreciate, however, that the apparatus and methods of the present invention are also applicable to wireless communications systems that provide other types of messaging services. For example, these systems may provide a choice of standard or robust communication of information other than short messages, such as control messages, point-to-point voice and/or data traffic, and the like.

Figure 3:
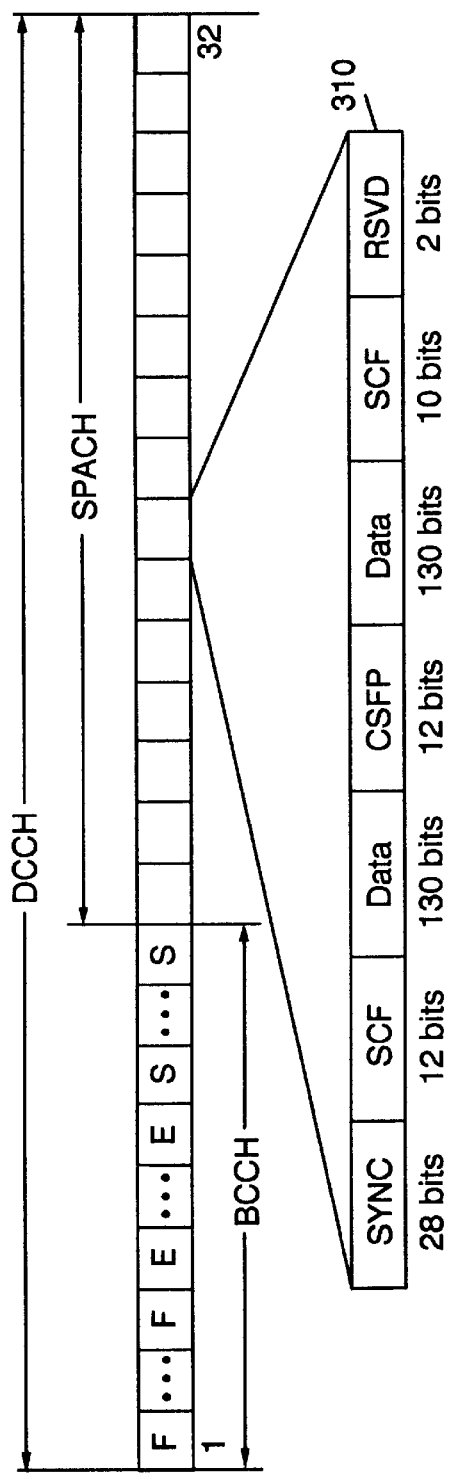
FIG. 3 illustrates a structure for an IS-136 Digital Control Channel (DCCH).

An Exemplary Wireless Communications System with a High-Penetration Messaging Capability In a wireless communications system conforming to the IS-136 standard, short messages are communicated over a Digital Control Channel (DCCH). FIG. 3 illustrates an IS-136 Digital Control Channel DCCH configuration. The Digital Control Channel DCCH is a "physical channel," that is, an actual portion of a signal propagation resource defined in terms of frequency and time divisions. Several "logical" channels are mapped onto the Digital Control Channel DCCH. These logical channels include a multiplexed Broadcast Channel BCCH designed to convey information about system configuration and system access rules, and a multiplexed point-to-point short message service (SMS), paging and access response channel SPACH.

The Broadcast Channel BCCH is further divided into logical channels. These logical channels include a Fast Broadcast Channel (F-BCCH) F for conveying time-critical information such as system identification (ID) and registration information, an Extended Broadcast Channel (E-BCCH) E for conveying less time critical information such as neighboring cell lists, and an SMS Broadcast Channel (SMS-BCCH) S. The combined SMS, paging and access response channel SPACH comprises a short message service channel (SMSCH) for carrying messages, a paging channel (PCH) for conveying system pages, and an access response channel (ARCH) for providing system response to queries from subscriber units and other administration information.

The slots of each Digital Control Channel DCCH frame start with F-BCCH slots F, followed by E-BCCH slots E, S-BCCH slots S and then the SMS, paging and access slots SPACH. The number of each type of slot in each frame is determined by system setup. As illustrated, each slot 310 of the Digital Control Channel DCCH includes 28 synchronization bits SYNC, 12 Shared Channel Feedback bits SCF bits for supporting a Random Access Channel (RACH), 260 data bits Data, 12 Coded Super Frame Phase bits CSFP for detecting the phase of the Super Frame, and 2 reserved bits RSVD.

A DCCH Super Frame (SF) includes 32 Digital Control Channel DCCH frames. When a subscriber unit such as a mobile radiotelephone first is turned on, the unit's receiver electronics search for a DCCH by reading the CSFP; if the CFSP is changing, the mobile unit has acquired the DCCH. From the CSFP the mobile unit can determine which slot is the first slot in the Super Frame, which allows the unit to then read the F-BCCH. The F-BCCH conveys information regarding the number of F-BCCH, E-BCCH and S-BCCH slots are present in the Super Frame. The mobile unit receives paging group information on the E-BCCH. Once this information is received, the mobile can determine which SPACH slot carries paging and SMS information directed to it. The mobile unit then reads the identified slot once per Super Frame to monitor for the presence of an incoming page or a short message. This periodic reading allows for the creation of a sleep mode cycle, i.e., the mobile can conserve power during times when it is not required to be actively monitoring for the arrival of a page or short message during its assigned slot.

A Hyper Frame includes two Super Frames, with the second Super Frame of a Hyper Frame being a repeat of the first Super Frame. If a subscriber unit is unable to read its slot in the SPACH in the first Super Frame of a Hyper Frame, it can attempt to read it again during the second Super Frame. If the subscriber unit is able to read its assigned SPACH slot in the first Super Frame, however, it can skip reading the second Super Frame.

Figure 4:
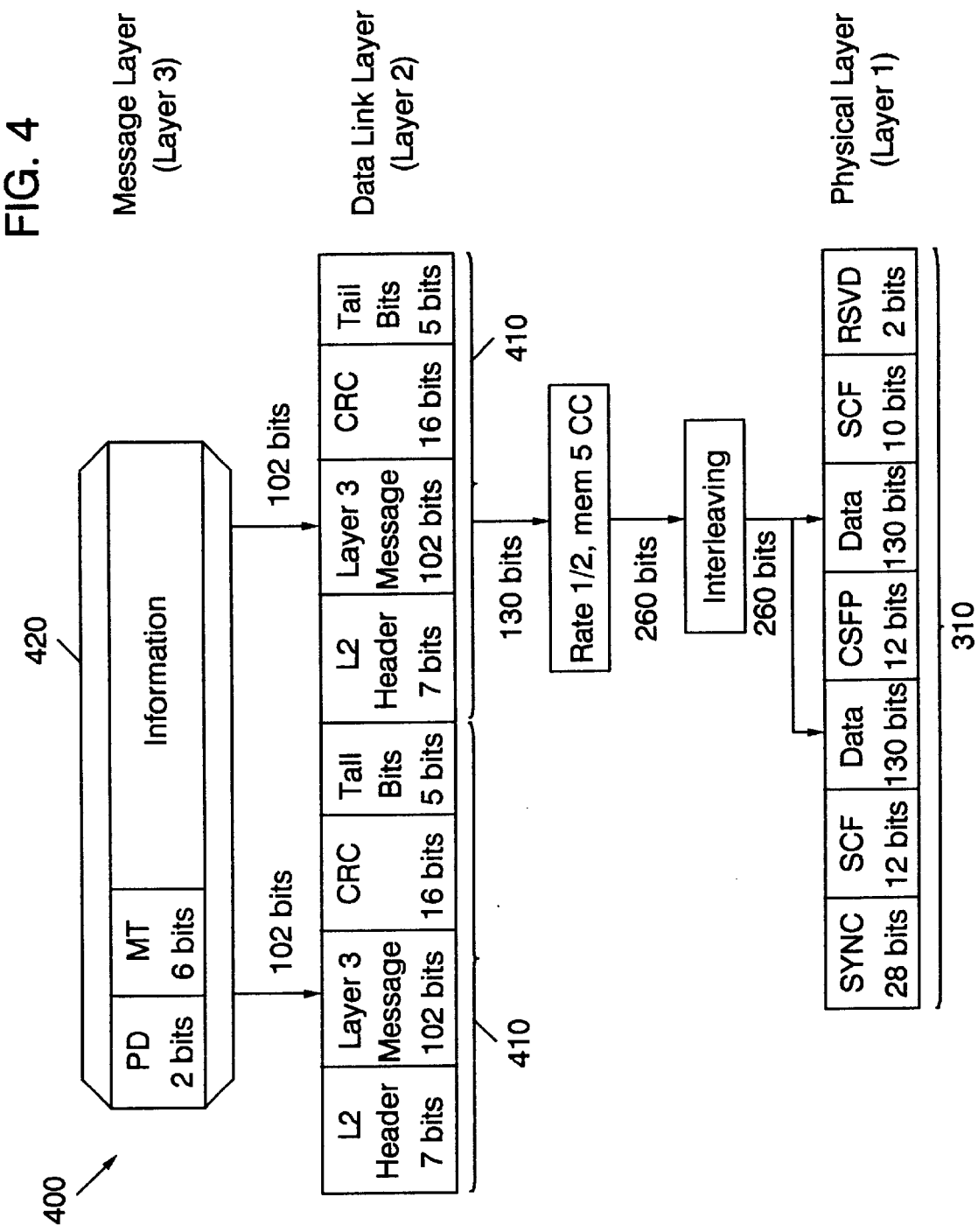
FIG. 4 illustrates a protocol stack for generating an IS-136 DCCH.

FIG. 4 illustrates a protocol stack 400 for generating a DCCH. A Data Link Layer (Layer 2) frame 410 includes a 7-bit header, 102 message bits, a 16-bit cyclic redundancy check (CRC) value, and 5 tail bits that are used for convolutional coding. The 130 bits of a Data Link Layer frame 410 are encoded according to a rate ½ convolutional code and then interleaved to produce 260 bits, which are then formatted and supplement to form a Physical Layer (Layer 1) slot 310. The Data Link Layer frame 410 is generated from a Message Layer (Layer 3) message 420 that includes a 2-bit protocol discriminator (PD) field and a 6-bit message type (MT) field.

The information in the Message Layer message 420 can be of variable length, depending on the particular message being sent. If the information in a given Message Layer message extends beyond 102 bits, multiple Data Link Layer frames 410 are used to transmit the Message Layer message 420. Accordingly, information in a Message Layer message 420 may be transmitted using a number of Physical Layer slots 310. When information in a Message Layer message extends beyond 102 bits, the message is typically transmitted using every other SPACH slot, with a bit in the header of each Data Link Layer frame 410 being set to a predetermined value to tell units in the particular paging group to look at every other SPACH slot for paging or SMS messages. In this manner, messages can be efficiently transmitted while reducing paging delays to units in other paging groups.

Figure 5A:
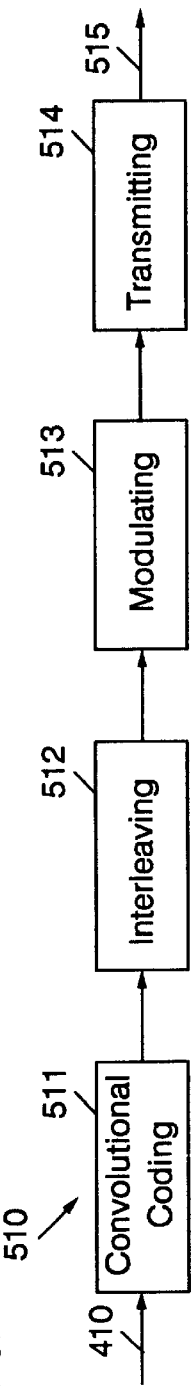
FIGS. 5A–B illustrate respective transmitter and receiver structures for an IS-136 system.
Figure 5B:
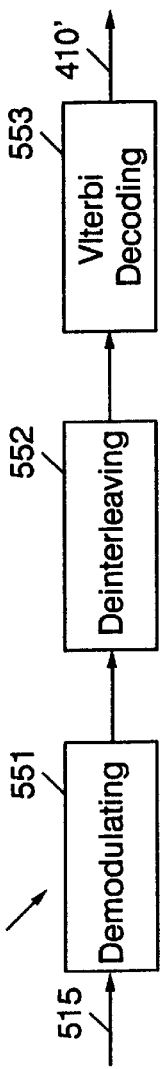

FIGS. 5A and 5B illustrate an exemplary transmitter structure 510 and an exemplary receiver structure 550, respectively, for communicating messages under a conventional standard such as IS-136. Referring to FIG. 5A, a Data Link Layer frame 410 is convolutionally encoded by convolutional coding means 511, with the convolutionally encoded bit stream then being interleaved by interleaving means 512. The encoded and interleaved bits are then modulated by modulating means 513, e.g., a π/4-DQPSK modulator. The output of the modulator 513 is then passed on to transmitting means 514 which transmits a corresponding radio communications signal 515.

Referring to FIG. 5B, the radio communications signal 515 is then received and coherently demodulated by coherent demodulating means 551 to produce a demodulated signal. The demodulated signal is then de-interleaved by de-interleaving means 552 and decoded by Viterbi decoding means 553 to produce a Data Link Layer frame 410' that represents an estimate of the originally transmitted Data Link Layer frame 410.

According to an aspect of the present invention, a "high-penetration" messaging service is provided in addition to a conventional messaging service such as that described above to allow communication with a subscriber unit when it is in a disadvantaged location, such as location falling between normal cell coverage regions or a location inside a building or other structure. The high penetration messaging service is provided by using a separate high-penetration channel that utilizes substantially the same transmission rate and power, and thus the substantially the same amount of spectral resource, as the normal messaging channel. The high-penetration channel, however, uses additional coding to provide higher redundancy and which allows the use of non-coherent detection techniques. The additional coding also preferably allows the use of common transmitter elements and receiver elements for both the normal messaging channel and the high-penetration channel.

Figure 6A:
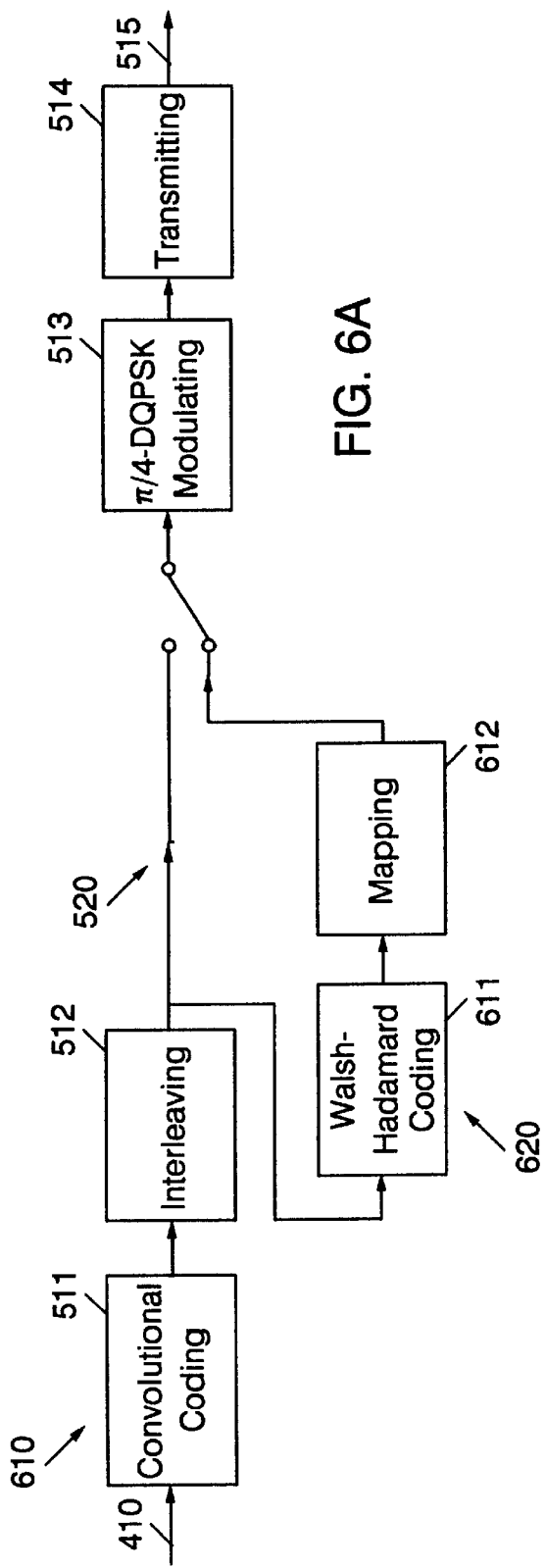
FIGS. 6A–B illustrate exemplary transmitting unit and receiving unit structures for a multi-service wireless communications system.
Figure 6B:
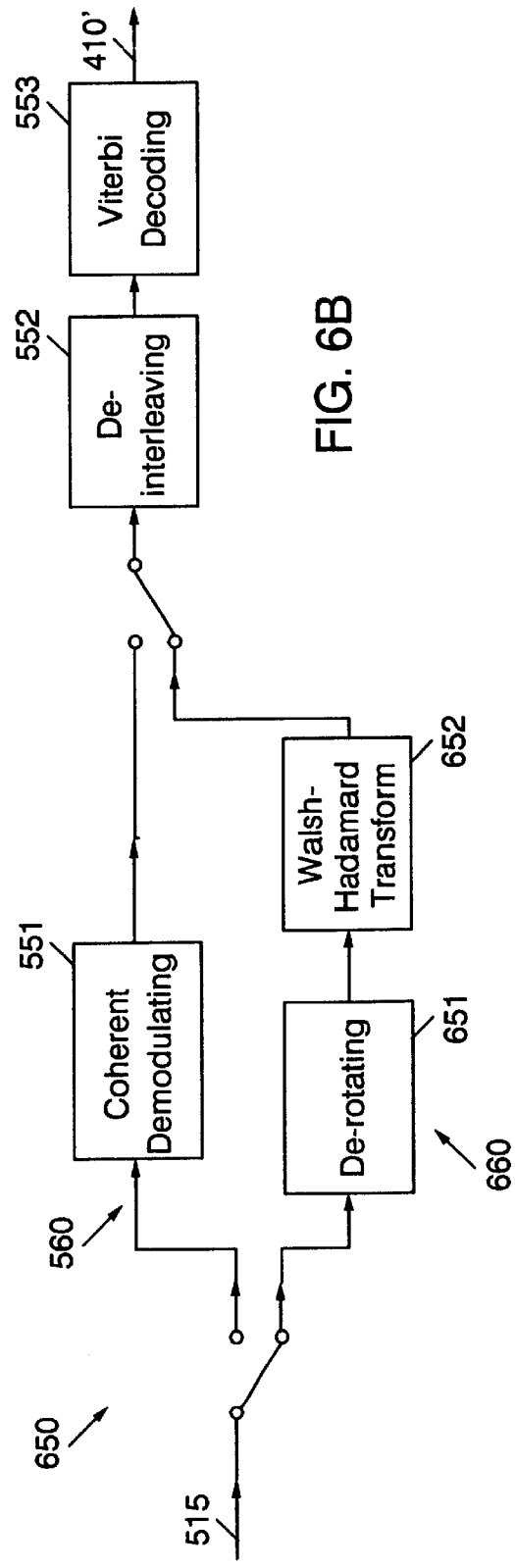

For example, as illustrated in FIGS. 6A and 6B, the additional coding may comprise an additional Walsh-Hadamard or other orthogonal or quasi-orthogonal code that introduces additional redundancy. An exemplary transmitting unit 610 includes convolutional coding means 511 and interleaving means 512. In a normal messaging channel 520, the interleaved and convolutionally encoded signal produced by the interleaving means 512 is supplied directly to a modulating means 513, e.g., a π/4-DQPSK modulator, for transmission by transmitting means 514. In a high-penetration channel 620, the interleaved and convolutionally encoded signal is additionally encoded by additional coding means 611, e.g., an encoder implementing a Walsh-Hadamard or other orthogonal or quasi-orthogonal code. The additionally encoded signal is mapped by mapping means 612 to produce a sequence that constrains the signal mapping of the modulating means 513 into a signal subset that produces a radio communications signal 515 that is amenable to non-coherent demodulation. An example of such a mapping is a bit repetition mapping that maps 4-level π/4-DQPSK modulation into a binary π/4-DBPSK modulation scheme, as described in a United States Patent Application entitled "High-Performance Half-Rate Coding Apparatus and Method for a TDM System," assigned to the assignee of the present application, filed Oct. 16, 1998, and incorporated by reference herein in its entirety as if the text is physically present.

As illustrated in FIG. 6B, a receiving unit 650 for receiving both normal and high penetration messages includes a coherent receiving branch 560 including means 551 for coherently demodulating a received radio communications signal 515, as well as a non-coherent receiving branch 660 including a de-rotating means 651 and a non-coherent demodulating means 652, e.g., a detector that implements a Walsh Hadamard transform. The output of the either the coherent receiving branch 560 or the non-coherent receiving branch 660 are then passed on to de-interleaving means 552 for de-interleaving and then to Viterbi decoding means 553 to recover a Data Link Layer frame 410' that represents an estimate of the originally transmitted Data Link Layer frame 410.

The additional coding preferably is an orthogonal or quasi-orthogonal code such as a Walsh-Hadamard or Nordstrom-Robinson code. The additional coding helps to raise the signal to noise ratio when communicating with a unit that is located in a disadvantaged location. The use of such a code with a mapping that maps the normal M-ary modulation into a binary modulation scheme that can be demodulated at the receiving terminal using non-coherent detection techniques. Coherent and non-coherent modulation techniques are well known to those skilled in the art. Several examples of these modulation techniques, as well as a discussion of Walsh-Hadamard and other codes may be found in *Digital Communications,* by Proakis, published by McGraw-Hill ($3^{rd}$ ed., 1995).

The use of noncoherent demodulation can avoid the need to perform channel estimation and tracking operations associated with coherent demodulation. Non-coherent demodulation is applied to an appropriately modulated signal, e.g., a differentially modulated, orthogonally modulated, quasi-orthogonally modulated, or similar signal. In a channel with significant delay spread, an appropriate demodulator is a so-called RAKE receiver, in which a received signal is correlated with each of the modulating sequences (e.g., the orthogonal, quasi-orthogonal, or other sequences used to produce the modulated signal), with different delays that model the delay spread of the channel. This and other demodulation techniques are described in the aforementioned text *Digital Communications,* by Proakis.

Those skilled in the art will appreciate that the components of the illustrated exemplary transmitting unit 610, i.e., the convolutional coding means 511, interleaving means 512, modulating means 513, and transmitting means 514, may comprise conventional transmission components typically found in base stations, mobile terminals or other similar communications apparatus. These components may include, for example, conventional transmitter circuits, antennas, processing circuits implemented in special purpose hardware such as an application-specific integrated circuit (ASIC) or in more general purpose hardware such as a digital signal processor (DSP), and the like. Similarly, elements of the receiving unit 650, i.e., the coherent demodulating means 551, de-rotating means 651, non-coherent demodulating means 652, de-interleaving means 552, and Viterbi decoding means 553, may comprise conventional receiving components commonly used in base stations, mobile terminals and the like. These components may include, for example, conventional antennas, mixers, signal and other processing circuits implemented in special purpose hardware such as an application-specific integrated circuit (ASIC) or in more general purpose hardware such as a digital signal processor (DSP) or microprocessor, and the like. Those skilled in the art will appreciate that, in general, the transmitting unit 610 and the receiving unit 650 may be implemented using special purpose analog or digital hardware, software running on general-purpose hardware, or combinations thereof.

Those skilled in the art will also appreciate that the structures of FIGS. 6A and 6B may be implemented in either base stations or subscriber terminals of a wireless communications system. For example, the normal and high-penetration messaging channels may be configured to communicate short messages from a base station to a subscriber unit, or to convey short message acknowledgements from a subscriber unit to a base station. More generally, the normal and high-penetration messaging channels may be used to provide voice and data messaging in either direction.

A protocol stack for implementing a high-penetration channel in an IS-136 compatible system is illustrated in FIG. 7. A Message Layer message 420 is formatted into a Data Link Layer frame 410 as described in reference to FIG. 5. In forming a modified high-penetration Physical Layer slot 720, however, an additional coding operation 710, here a (32,5) Walsh-Hadamard coding, is applied to increase redundancy in transmitting the information in the Message Layer message 420. The modified Physical Layer slot 310' includes a CDL field and a constant CSFP so that other units do not mistake the high-penetration slot 310' for a normal DCCH slot.

Figure 8:
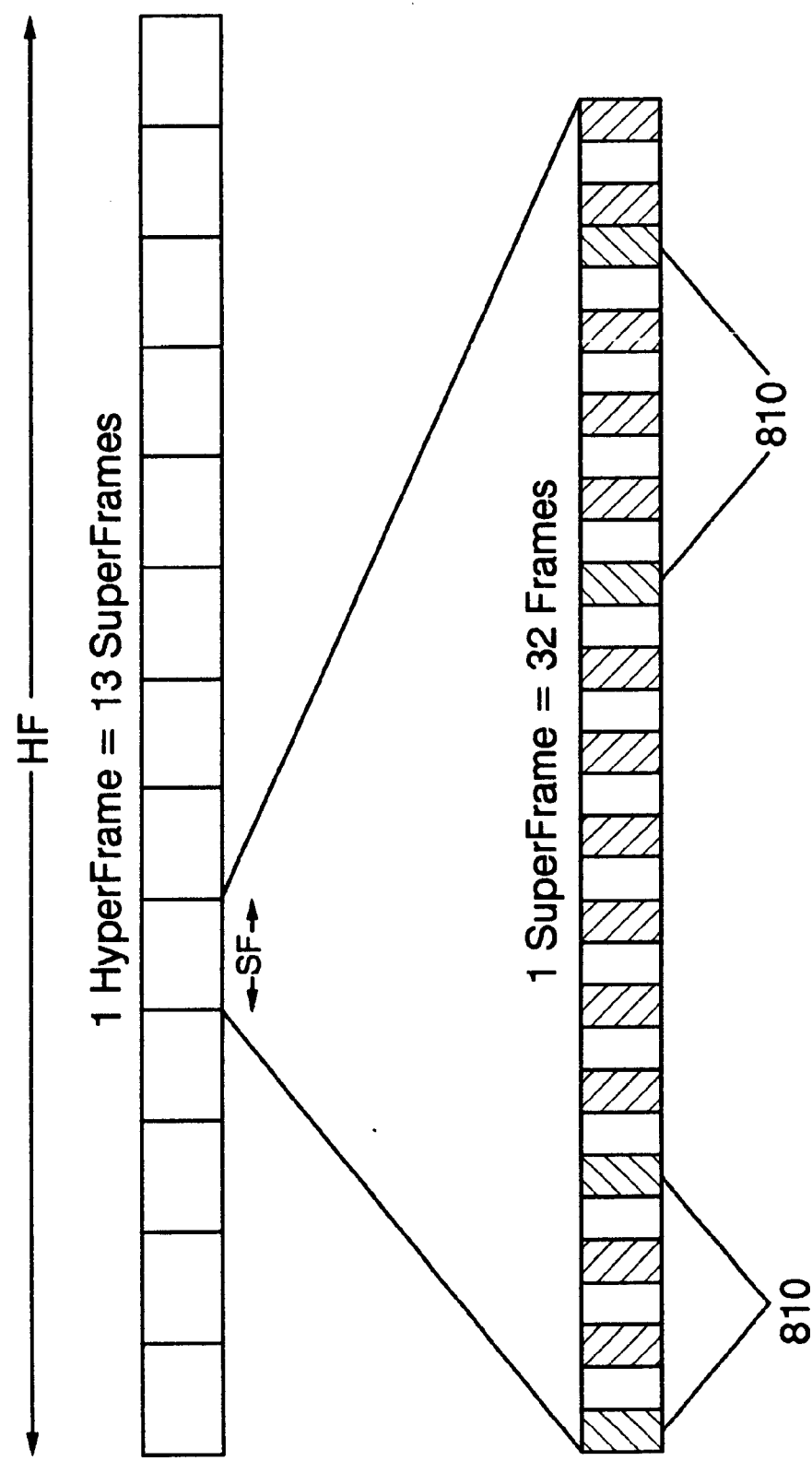
FIG. 8 illustrates an exemplary frame structure for a high penetration messaging channel.

A different Super Frame structure may be used for the high-penetration messaging channel to enable the receiving unit to gain synchronization with the transmitting station. Accordingly, as illustrated in FIG. 8, 4 slots 810 are used for synchronization bursts in each Super Frame SF. The synchronization slots 810 can be used for both channel acquisition and fine synchronization. The synchronization slots 810 may be irregularly spaced throughout the Super Frame SF so that the receiving unit can identify the first slot in the Super Frame SF.

As a result of the increased coding, the information of a Message Layer message transmitted using a high-penetration channel is spread out over a larger number of Physical Layer slots than in a conventional messaging channel. For example, in the modified IS-136 structure illustrated in FIGS. 7 and 8, a Data Link Layer frame is requires 13 Physical Layer slots, i.e., a Hyper Frame HF includes 13 Super Frames SF. This can introduce a delay in recovering the message in relation to a message transmitted on a conventional messaging channel, but does not require changing the sleep mode cycle of the receiving unit, as the unit still can be constrained to be active for one slot in each Super Frame SF.

Figure 9:
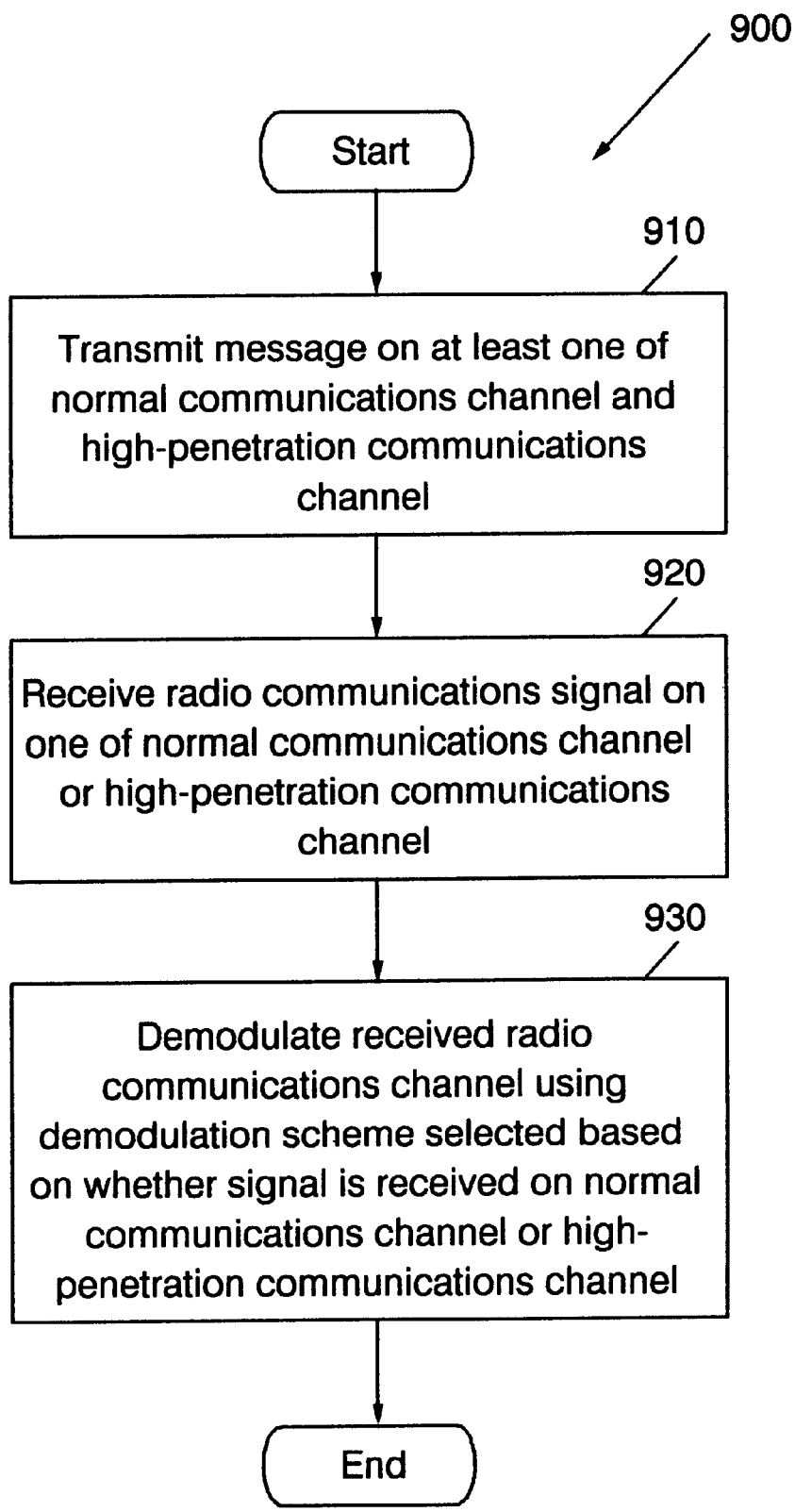
FIG. 9 illustrates exemplary operations for communicating messages over one of a normal and a high-penetration communications channel.

FIG. 9 illustrates exemplary operations 900 for communicating messages using one of a normal messaging channel and a high-penetration messaging channel according to aspect of the present invention. A message is transmitted on one of normal communications channel or a high-penetration communications channel (Block 910). A radio communications signal is received on one of the normal communications channel or the high-penetration communications channel (Block 920). The received radio communications signal is demodulated using a demodulation scheme that is selected based on whether the radio communications signal is received on the normal communications channel or the high-penetration communications channel (Block 930).

Those skilled in the art will appreciate that the operations of FIG. 9 can be implemented in a number of different ways, and that specific steps for performing these operations may depend on the type of message being communicated. For example, broadcast control messages, e.g., messages containing system identification and synchronization information, may be concurrently transmitted by a base station on both a normal communications channel and a high-penetration communications channel so that subscriber units can acquire the system using one of the channels. A subscriber unit attempting to acquire the system might first tune to the normal channel and, failing to successfully receive the transmitted control information on that channel, retune to the high-penetration channel to gain access. Alternatively, in a point-to-point messaging context, a base station might transmit a message first on a normal communications channel in an attempt to reach a particular subscriber unit, and then transmit the message on the high-penetration communications channel in the event that an acknowledgement of the message transmitted on the normal channel is not received within a predetermined time. Methods and apparatus for switching between normal and high-penetrations channels are described in a related application entitled "Wireless Communications Standard and Robust Services and Methods of Operation Thereof," assigned to the assignee of the present invention, filed concurrently herewith, and incorporated herein by reference in its entirety.

Those skilled in the art will appreciate that the present invention is not limited to the illustrated embodiments of FIGS. 6A–B and 7–9. The methods and apparatus of the present invention are also applicable to the communication of other content than short messages; for example, similar techniques could be used to communicate short message acknowledgements, voice and data.

Other variations also fall with the scope of the present invention. For example, the actual data, e.g., the actual "bits" sent over the alternative normal and high-penetration channels, need not be identical. As used herein, "message" refers to a quantum of information content. This content may be represented in a number of different ways, depending on the channel being used; for instance, information content contained in a Message Layer message transmitted over a normal channel may be represented in a streamlined or compact format on a high-penetration channel to reduce the negative effects of message delay over the high-penetration channel. An example of such a technique could involve sending a set of control information via a logical channel defined in a normal channel such as an IS-136 DCCH under normal conditions and, for purposes of simply maintaining contact with a unit in a disadvantaged location, a smaller subset of the set of control channel information may be transmitted on a high-penetration channel.

Switching Between Standard and Robust Services

In broad terms, a wireless communications system such as the system described above offers a plurality of services, including "regular" or "standard" services such as regular DAMPS messaging and "robust" higher-reliability services such as the high-penetration messaging described above. Such services may also be combined with other types of services, such as services that use increased bandwidth and/or transmit power to improve fidelity and/or other performance characteristics.

For purposes of the discussion herein, "standard" or "regular" services include services normally provided in wireless systems, e.g., standard voice, data or control channels. "Robust" services include services that utilize substantially the same bandwidth and transmit power as standard services, but which provide increase reliability through such mechanisms as the increased coding used in the high-penetration messaging described above.

These types of services can be categorized according to both the spectral demand and non-spectral demand that they place on the wireless communications system. Spectral demand may include such things as bandwidth required to operate the service, both in terms of the frequency band occupied by the signals used to communicate according to the service and in terms of the bandwidth consumed by reduced frequency reuse and additional interference associated with increased transmit power. Non-spectral demand may include additional hardware, software and operational complexity introduced by the service that can lead to increased capital equipment and operational costs, such as the additional encoding and message delay associated with a robust service such as the high-penetration messaging service described above. Generally speaking, "robust" services, while utilizing substantially the same bandwidth, transmit power and transmission rate as "standard" services, typically have high associated non-spectral demand in comparison to corresponding standard services. For example, a high redundancy service such as the high-penetration messaging service described above generally requires additional system complexity.

Figure 2:
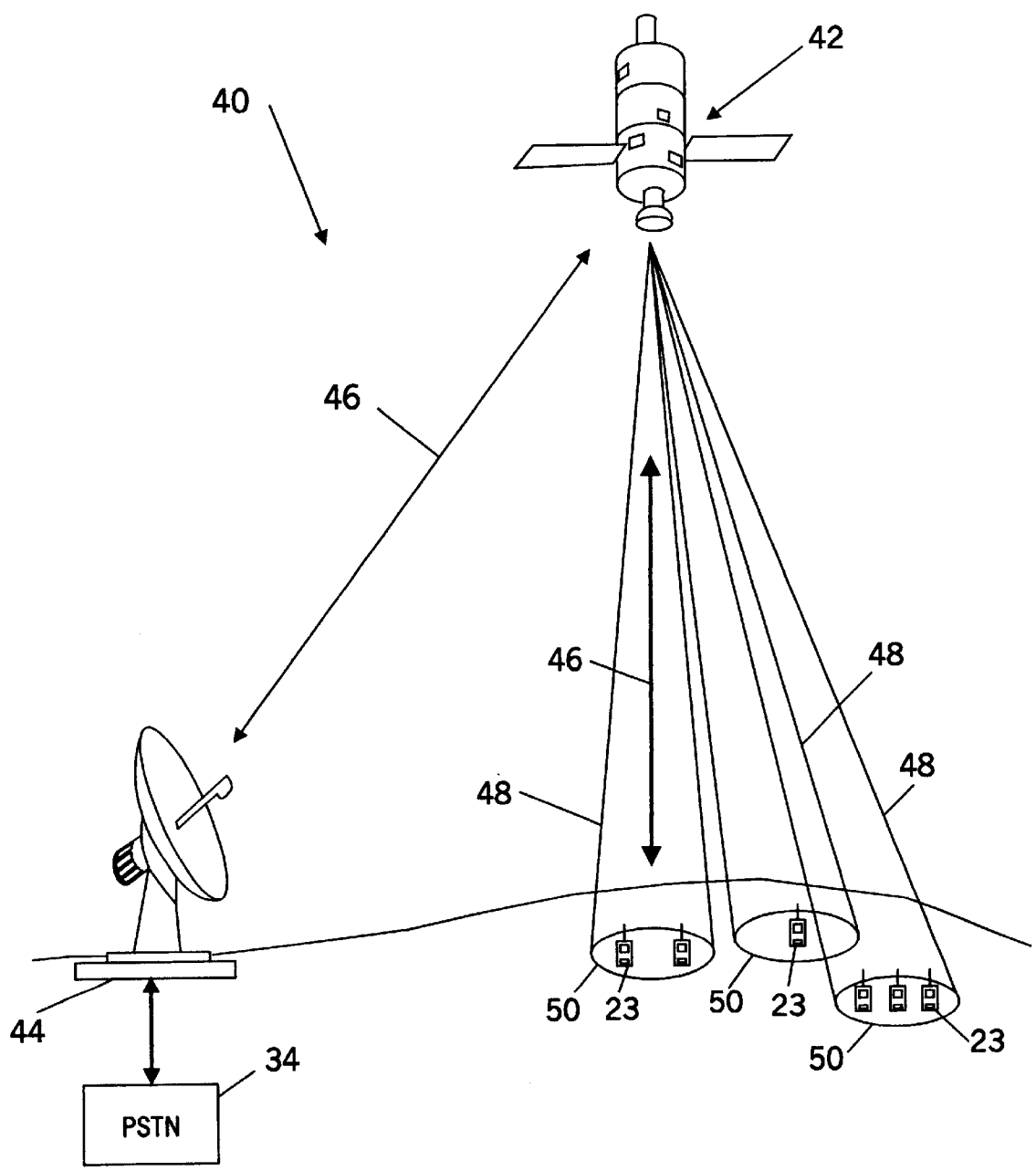
FIG. 2 illustrates a conventional satellite-based cellular radiotelephone communications system.

FIGS. 10–14 are flowchart illustrations of exemplary operations for switching between a standard service and a "robust" high-penetration service such as the high-penetration messaging service described above. It will be understood that blocks of the flowchart illustrations, and combinations of blocks in the flowchart illustrations, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. For example, blocks of the flowchart illustrations may be implemented as computer instructions that are loaded and executed by the PSTN, MTSO, base stations and/or mobile terminals of radiotelephone systems such as those illustrated in FIGS. 1 and 2. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

It will also be understood that the blocks of the flowchart illustrations may in implemented using the messaging apparatus and methods described with respect to FIGS. 3–9. For example, functions illustrated by the blocks of the flowchart illustrations that relate to communicating over robust, high-penetration messaging channels may be performed using the apparatus and methods of FIGS. 5A–9.

Figure 10:
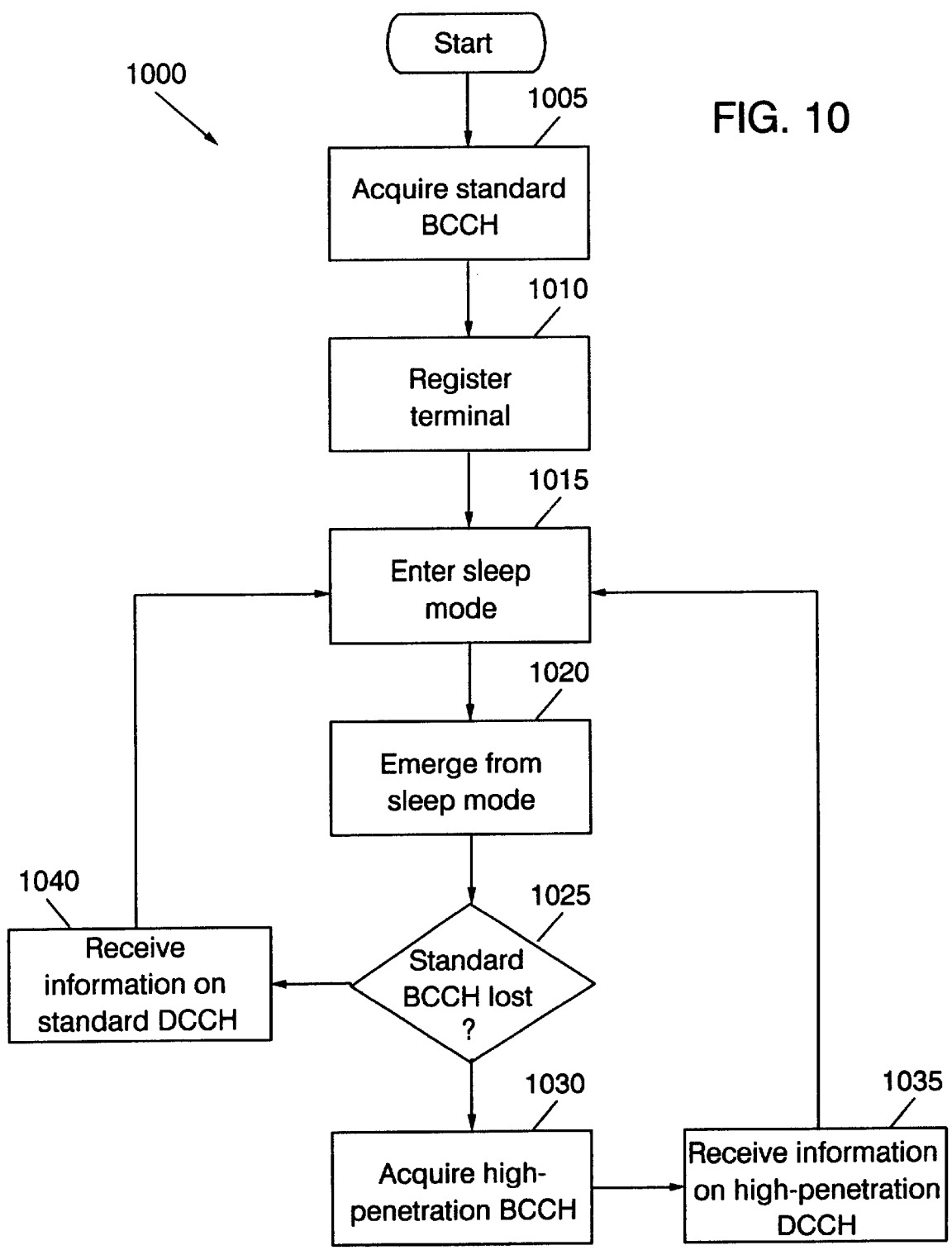

FIG. 10 illustrates exemplary operations 1000 for controlling a terminal that is already registered in a wireless communications system. The terminal acquires a standard broadcast control channel (BCCH) and registers with a wireless communications system, for example, using standard power-on search techniques (Blocks 1005, 1010). The terminal then enters a sleep mode (Block 1015). Upon emergence from sleep mode (Block 1020), the terminal attempts to reacquire the standard BCCH (Block 1025). If the standard BCCH is not lost upon emergence from sleep mode, the terminal continues to communicate via the standard control and/or traffic channels (Block 1040).

If the standard BCCH is lost, however, the terminal then may acquire a robust high-penetration BCCH (Block 1030). This may be achieved in a number of ways. For example, the standard BCCH and the high-penetration BCCH may be transmitted during respective time slots on a common carrier frequency band, thus enabling the "lost" terminal, which may be still roughly synchronized with the wireless communications system, to simply change the time during which it looks for a synchronization sequence in order to acquire the high-penetration BCCH without being required to retune to a different frequency band. The high-penetration BCCH may be provided on a predetermined channel identified, for example, upon registration of the terminal or a similar event, such the terminal seeking the high-penetration BCCH will know to look, for example, to a predetermined frequency and/or time slot to locate the channel. Alternatively, the location of the high-penetration channel may be dynamically defined and conveyed to the terminal via a standard channel, such as the standard BCCH. Once the high-penetration BCCH is acquired, the terminal may then receive system and other information on other high penetration control and/or traffic channels, such as the channels of the high-penetration DCCH described above (Block 1035). If the terminal is unable to acquire the high-penetration BCCH, several options may be made available to the user, such as automatic retry, retry upon request, and the like.

Figure 11:
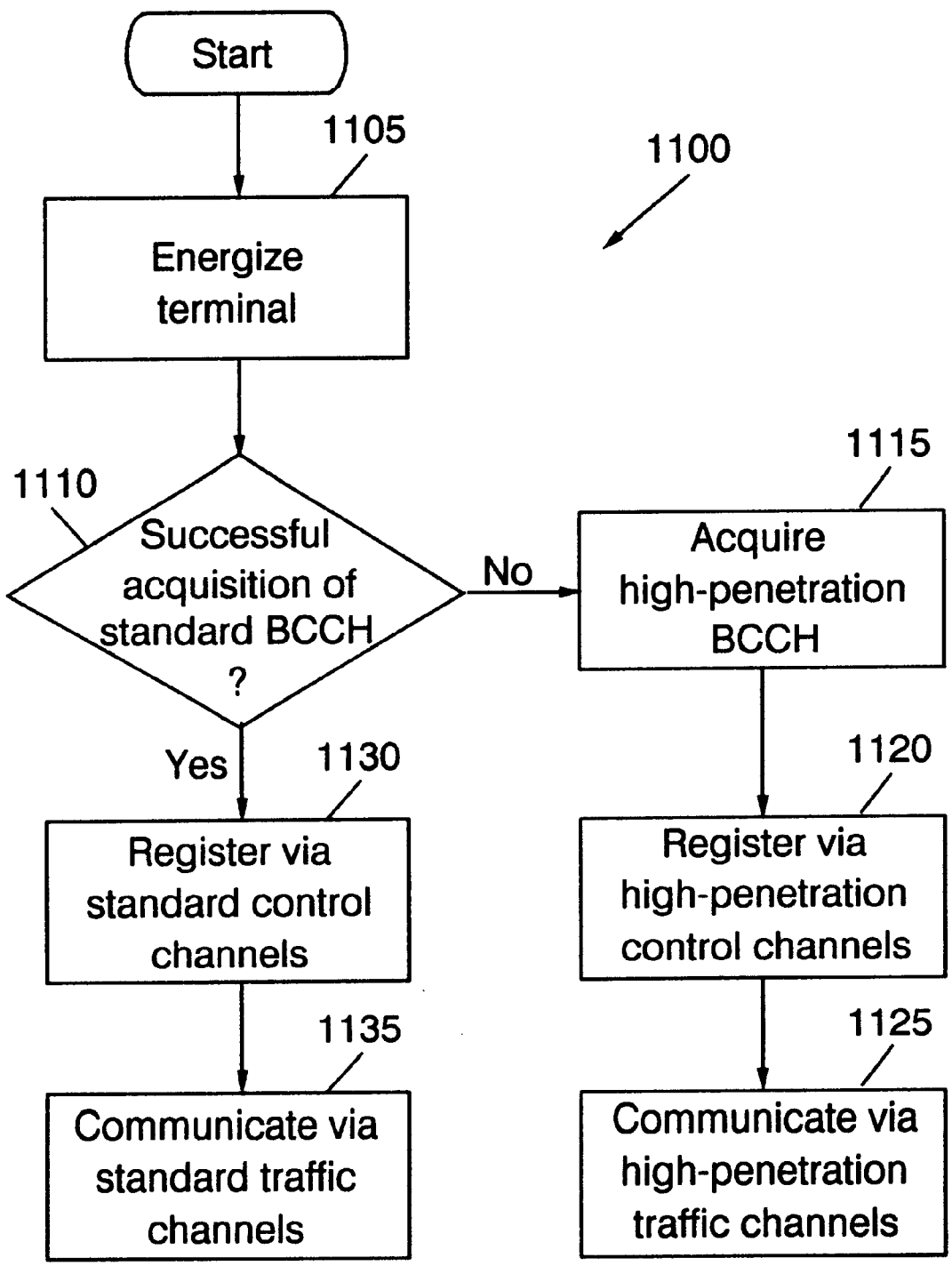

FIG. 11 illustrates exemplary operations 1100 for acquiring one of a standard BCCH or a high-penetration BCCH from a cold start. After energizing (Block 1105), a terminal attempts to acquire the standard BCCH (Block 1110). If the attempt is successful, the terminal registers and communicates via standard channels (Blocks 1130, 1140). If the terminal is unable to acquire the standard BCCH, however, it acquires the high-penetration BCCH (Block 1115) and registers and communicates via high-penetration control and/or traffic channels (Blocks 1120, 1125).

Figure 12:
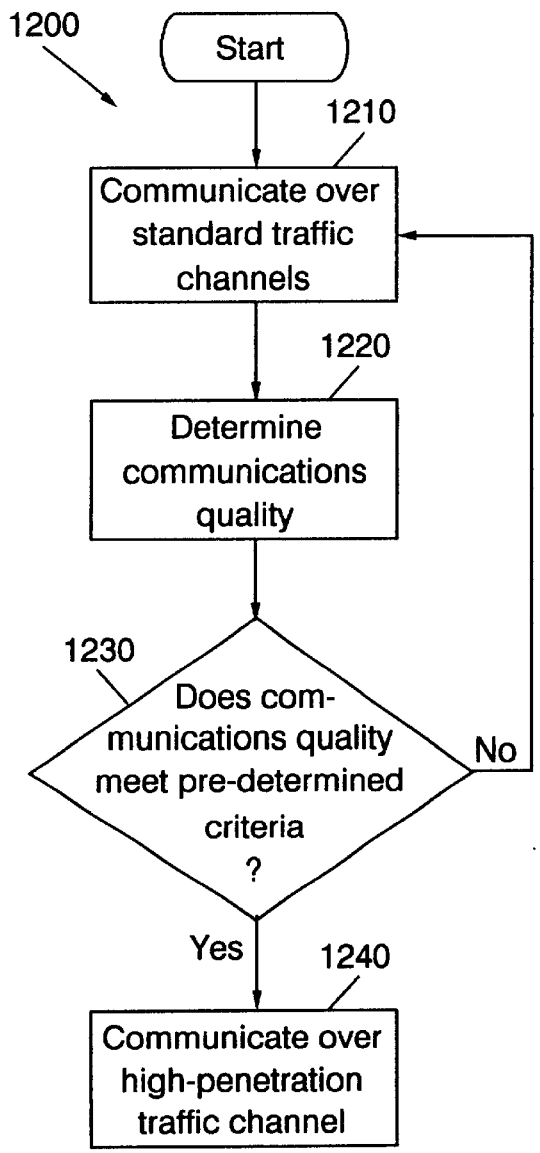

The operations of FIGS. 10 and 11 can be generalized to encompass switching between other types of standard and robust channels, for example, between standard and robust traffic channels that carry point to point information such as voice information or data. FIG. 12 illustrates exemplary general operations 1200 for switching from a standard traffic channel to a robust, high penetration traffic channel. A terminal and base station communicate over a standard traffic channel (Block 1210). A measure of communications quality for the standard traffic channel is then determined (Block 1220). The measure may represent any of a number of measures of communications quality, including, but not limited to, received signal strength (RSS) measures, bit error rate (BER) measures, frame error rate (FER) measures, various decoding error metrics, and combination thereof. Techniques for determining such measures of communications quality are well known to those skilled in the art and need not be discussed in greater detail herein.

If the determined measure communications quality meets a predetermined criterion, the base station and terminal switch to one or more high-penetration communications channels to continue communications (Blocks 1230, 1240). Otherwise, the base station and terminal continue to communicate over standard channels (Blocks 1230, 1210). The switching between standard and robust channels may occur in various ways, including intermediate steps of switching between standard and robust control channels such as the standard and robust broadcast control channels described above.

Figure 13:
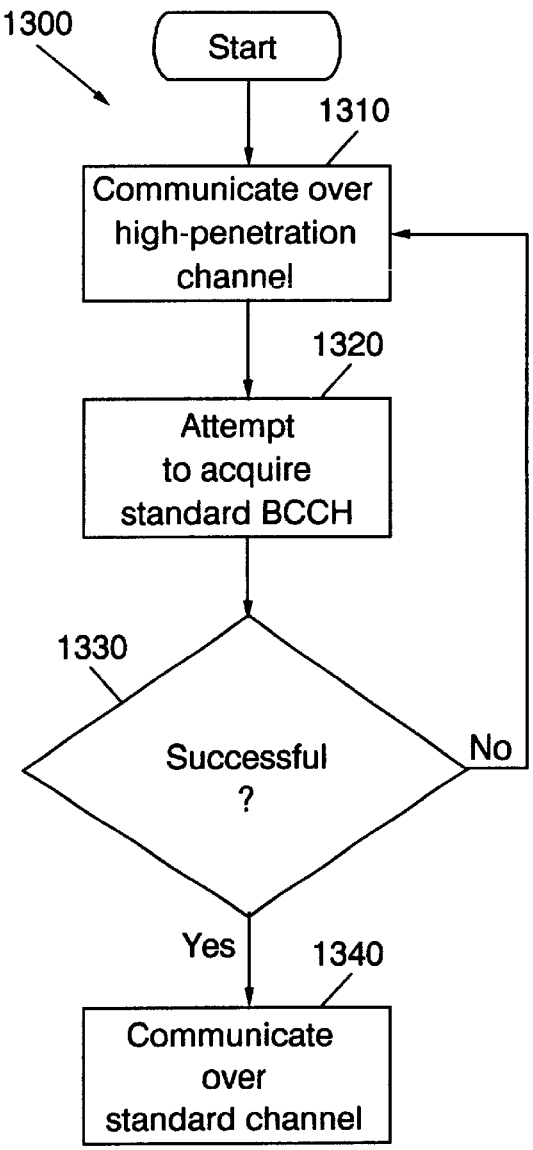

Switching back to a standard service may occur in a similar manner. FIG. 13 illustrates exemplary operations 1300 for switching back to a standard channel from a high penetration channel. A terminal and base station communicate over one or more high-penetration channels, such as the high-penetration BCCH described above (Block 1310). Periodically, the terminal attempts to acquire the standard BCCH (Block 1320). If an attempt is successful, the terminal and base station switch to communicating over the standard BCCH and/or other standard channels (Blocks 1330, 1340). If not, the base station and terminal continue to communicate via the high-penetration BCCH and related channels (Block 1330, 1310). Success in acquiring a standard channel such as a standard BCCH may be conditioned upon a number of different criteria, such as signal strength, bit error rate, frame error rate and the like.

FIG. 14 illustrates exemplary operations 1400 that implement a staged process for attempting to acquire a standard service. A terminal first tunes to the standard BCCH (Block 1410), and computes a correlation with the synchronization sequence of the standard BCCH (Block 1420). If the correlation fails to meet a predetermined criteria, the attempt is judged unsuccessful and the terminal continues to communicate using the high-penetration channel (Blocks 1430, 1435). If the correlation meets the predetermined criterion, however, the terminal next attempts to decode the standard BCCH (Block 1440). If decoding is unsuccessful, for example, if the terminal decodes a message for which a CRC error check indicates an error, the attempt to acquire the standard BCCH is considered unsuccessful, and the terminal continues to communicate using the high-penetration channel (Blocks 1450, 1435). If the standard BCCH is successfully decoded, the terminal then proceeds to make further attempts to communicate via standard channels (Block 1460). For example, the terminal may go on to attempt to receive other channels in the standard DCCH. During any of these attempts, the terminal may revert to the high-penetration service should communication over the standard channels fail, as illustrated, for example, in FIG. 12.

Those skilled in the art will appreciate that the illustrated operations of FIGS. 10–14 represent examples of operations for switching between standard and robust services, and that many variations to these operations fall within the scope of the present invention. For example, more elaborate switching operations may be employed, such as multi-tiered procedures for switching between standard and robust traffic channels that involve intermediate transitions between standard and robust control channels. In the case of broadcast channels such as the broadcast control channels described above, information may be simultaneously broadcast on both standard and high-penetration broadcast control channels, with the terminal choosing reception over one of the channels based on communications quality determinations made at the terminal. Alternatively, control may rest in both the sending and receiving units. For example, for point-to-point messaging channels, information may be transmitted on one of a standard channel or a robust channel based on signal quality determinations made at the base station and/or terminal. In this manner, high-penetration services may be offered while conserving bandwidth.

In another embodiment according to the present invention, a message may be transmitted more frequently on a standard channel than on a robust high-penetration channel. The transmission may be done on a fixed schedule so that a receiving unit can more easily switch to the high-penetration service.

In yet another embodiment, a message intended for a specific class of users is transmitted on the channel over which the last previous message was successfully communicated. Accordingly, if the last previous message was successfully communicated over the standard channel, the next message will first be transmitted on the standard channel. However, if the last message was successfully communicated on the robust, high-penetration channel, the message will be transmitted on the robust channel first. This process could be constrained based on the time interval between messages, as well as by measures of recent history of success in communicating over the alternate channels. For example, a recent history of success in communicating over the standard channel may be interpreted as an indication that the receiving unit is in an advantageous receiving location and, accordingly, may be used as a basis for continuing first transmitting on the standard channel until a sufficient number of failures indicate that the receiving unit has moved to a disadvantaged location.

Summary

According to the present invention, wireless communications apparatus and methods are provided in which information is communicated over one of standard channel and a "robust" high-penetration channel that provides increased reliability without requiring increased transmit power or bandwidth. Switching between the standard channel and the high-penetration channel is controlled based on a determination of communications quality for at least one of the channels.

The present invention can provide improved communications with units in disadvantaged locations while reducing the potential for interference and power problems. Because increased transmit power is not required, multi-service capability can be practically implemented in either base stations or subscriber units such as mobile terminals. Provision of both standard and high-penetration messaging services can be implemented with minimal changes to existing hardware and protocols.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In a wireless communications system, a method of communicating comprising the steps of:

determining a measure of quality of communications for at least one of a first communications channel having a first redundancy level associated therewith and a second communications channel having a second redundancy level associated therewith, the second redundancy level different than the first redundancy level, wherein the first and second communications channels share a common modulator, wherein the modulator uses a first modulation constellation on the first communications channel, and wherein the second communications channel comprises an error correction coding that constrains the modulator to use a second modulation constellation that is a reduced subset of the first modulation constellation; and communicating over one of the first communications channel or the second communications channel selected based on the determined measure of communications quality.

2. A method according to claim 1, wherein the first redundancy level is less than the second redundancy level.

3. A method according to claim 2:
wherein said step of determining is preceded by the step of communicating over the first communications channel;
wherein said step of determining comprises the step of determining a measure of communications quality for the first communications channel; and
wherein said step of communicating over one of the first communications channel or the second communications channel comprises the step of communicating over the second communications channel if the determined measure of communications quality for the first communications channel meets a predetermined criterion.

4. A method according to claim 3:
wherein said step of determining comprises the step of attempting to communicate over the first communications channel; and
wherein said step of communicating comprises the step of communicating over the second communications channel if the attempt to communicate over the first communications channel fails.

5. A method according to claim 4:
wherein said step of attempting to communicate over the first communications channel comprises the step of attempting to acquire a first broadcast control channel; and
wherein said step of communicating over the second communications channel comprises the step of acquiring a second broadcast control channel responsive to a failure to acquire the first broadcast control channel.

6. A method according to claim 5, wherein said step of attempting to acquire a first broadcast control channel comprises the step of attempting to acquire the first broadcast control channel at a wireless terminal upon emergence from a sleep mode of the wireless terminal.

7. A method according to claim 4, wherein said step of communicating over the second communications channel is followed by the step of again attempting to communicate over the first communications channel.

8. A method according to claim 7, wherein said step of communicating over the second communications channel is followed by the steps of:
attempting to communicate over the first communications channel; and
continuing to communicate over the second communications channel until information is successfully communicated over the first communications channel; and then communicating over the first communications channel after a successful attempt to communicate over the first communications channel.

9. A method according to claim 1, wherein said step of determining comprises the step of determining at least one of a signal strength, a frame error rate and a bit error rate.

10. A method according to claim 1, wherein the first communications channel comprises a first control channel and wherein the second communications channel comprises a second control channel.

11. A method according to claim 1, wherein the wireless communications system comprises a time division multiple access (TDMA) communications system operative to communicate information over a plurality of carrier frequency bands during a plurality of predetermined time slots, and wherein the first communications channel and the second communications channel use different time slots of a common carrier frequency band.

12. A method according to claim 1:
wherein said step of determining is receded by the step of receiving information identifying the second communications channel on the first communications channel;
wherein said step of determining comprises the step of determining a measure of communications quality for the first communications channel; and
wherein said step of communicating over one of the first communications channel and the second communications channel comprises the step of receiving information on the identified second communications channel if the determined measure of communications quality for the first communications channel meets a predetermined criterion.

13. A method according to claim 1, wherein communication over the first communications channel and communication over the second communications channel use substantially the same amount of spectral resource.

14. A method according to claim 1, wherein said step of communicating over one of the first communications channel or the second communications channel comprises the step of transmitting on one of the first communications channel or the second communications channel based on the determined measure of communications quality.

15. A method according to claim 1, wherein said step of communicating over one of the first communications channel or the second communications channel comprises the step of receiving on one of the first communications channel or the second communications channel based on the determined measure of communications quality.

16. A method according to claim 1, wherein said step of communicating comprises the steps of:
modulating a carrier according to one of a first modulation scheme or a second modulation scheme to produce a modulated communications signal, wherein the second modulation scheme utilizes a constellation representing a subset of the first modulation scheme;
transmitting the modulated communications signal over one of the first communications channel or the second communications channel;
receiving the transmitted modulated communications signal on one of the first communications channel or the second communications channel; and
demodulating the received communications signal according to one of the first modulation scheme or the second modulating scheme based on whether the received communications signal is received on the first communications channel or the second communications channel.

17. A method of communicating in a communications system, the method comprising the steps of:
determining a measure of quality of communications for at least one of a first communications channel having a first redundancy level associated therewith and a second communications channel having a second redundancy level associated therewith, the second redundancy level different than the first redundancy level; and
communicating over one of the first communications channel or the second communications channel selected based on the determined measure of communications quality, wherein said step of communicating comprises the steps of:
  modulating a carrier according to one of a first modulation scheme or a second modulation scheme to produce a modulated communications signal, wherein the second modulation scheme utilizes a constellation representing a subset of the first modulation scheme;
  transmitting the modulated communications signal over one of the first communications channel or the second communications channel;
  receiving the transmitted modulated communications signal on one of the first communications channel or the second communications channel; and
  demodulating the received communications signal according to one of the first modulation scheme or the second modulating scheme based on whether the received communications signal is received on the first communications channel or the second communications channel, wherein said step of demodulating comprises the step of coherently demodulating the received communications signal if the received communications signal is received on the first communications channel and non-coherently demodulating the received communications signal if the received communications signal is received on the second communications channel.

18. A method according to claim 12, wherein said step of determining and said step of communicating are performed at one of a base station or a mobile terminal.

19. In a wireless communications system, an apparatus comprising:
  means for determining a measure of quality of communications for at least one of a first communications channel having a first redundancy level associated therewith and a second communications channel having a second redundancy level associated therewith, the second redundancy level different than the first redundancy level, wherein the first and second communications channels share a common modulator, wherein the modulator uses a first modulation constellation on the first communications channel, and wherein the second communications channel comprises an error correction coding that constrains the modulator to use a second modulation constellation that is a reduced subset of the first modulation constellation; and
  means for communicating over one of the first communications channel or the second communications channel selected based on the determined measure of communications quality.

20. An apparatus according to claim 19, wherein the first redundancy level is less than the second redundancy level.

21. An apparatus according to claim 20:
  wherein said means for determining comprises means for determining a measure of communications quality for the first communications channel; and
  wherein said means for communicating comprises means for communicating over the second communications channel if the determined measure of communications quality for the first communications channel meets a predetermined criterion.

22. An apparatus according to claim 21:
  wherein said means for determining comes means for attempting to communicate over the first communications channel; and
  wherein said means for communicating comprises means for communicating over the second communications channel if an attempt to communicate over the first communications channel fails.

23. An apparatus according to claim 22:
  wherein said means for determining comprises means for attempting to acquire a first broadcast control channel; and
  wherein said means for communicating over the second communications channel means for acquiring a second broadcast control channel responsive to a failure to acquire the first broadcast control channel.

24. An apparatus according to claim 23, wherein said means for determining means for attempting to acquire the first broadcast control channel at a wireless terminal upon emergence from a sleep mode of the wireless terminal.

25. An apparatus according to claim 23, wherein said means for communicating over one of the first communications channel or the second communications channel comprises means for continuing to communicate over the second communications channel until information is successfully communicated over the first communications channel and then communicating over the first communications channel after a successful attempt to communicate over the first communications channel.

26. An apparatus according to claim 19, wherein said means for determining comprises means for determining at least one of a signal strength, a frame error rate and a bit error rate.

27. An apparatus according to claim 19, wherein the first communications channel comprises a first control channel and wherein the second communications channel comprises a second control channel.

28. An apparatus according to claim 19, wherein the wireless communications system comprises a time division multiple access (TDMA) communications system operative to communicate information over a plurality of carrier frequency bands during a plurality of predetermined time slots, and wherein the first communications channel and the second communications channel use respective different time slots of a common carrier frequency band.

29. An apparatus according to claim 19, further comprising means for receiving information identifying the second communications channel on the first communications channel, and:
  wherein said means for determining comprises means for determining a measure of communications quality for the first communications channel; and
  wherein said means for communicating over one of the first communications channel and the second communications channel comprises means for receiving information on the identified second communications channel if the determined measure of communications quality for the first communications channel meets a predetermined criterion.

30. An apparatus according to claim 19, wherein said means for communicating uses substantially the same amount of spectral resource when communicating over the first communications channel as when communicating over the second communications channel.

31. An apparatus according to claim 19, wherein said means for communicating comprises means for transmitting on one of the first communications channel or the second communications channel based on the determined measure of communications quality.

32. An apparatus according to claim 19, wherein said means for communicating comprises means for receiving on one of the first communications channel or the second communications channel based on the determined measure of communications quality.

33. An apparatus according to claim 19, wherein said means for communicating comprises:
   means for modulating a carrier according to one of a first modulation scheme or a second modulation scheme to produce a modulated communications signal, wherein the second modulation scheme utilized a constellation representing a subset of the first modulation scheme;
   means for transmitting the modulated communications signal over one of the first communications channel or the second communications channel;
   means for receiving the transmitted modulated communications signal on one of the first communications channel or the second communications channel; and
   means for demodulating the received communications signal according to one of the first modulation scheme or the second modulating scheme based on whether the received communications signal is received on the first communications channel or the second communications channel.

34. In a wireless communications system, and apparatus comprising:
   means for determining a measure of quality of communications for at least one of a first communications channel having a first redundancy level associated therewith and a second communications channel having a second redundancy level associated therewith, the second redundancy level different than the first redundancy level; and
   means for communicating over one of the first communications channel or the second communications channel selected based on the determined measure of communications quality, wherein said means for communicating comprises:
      means for modulating a carrier according to one of a first modulation scheme or a second modulation scheme to produce a modulated communications signal, wherein the second modulation scheme utilized a constellation representing a subset of the first modulation scheme;
      means for transmitting the modulated communications signal over one of the first communications channel or the second communications channel;
      means for receiving the transmitted modulated communications signal on one of the first communications channel or the second communications channel; and
      means for demodulating the received communications signal according to one of the first modulation scheme or the second modulating scheme based on whether the received communications signal is received on the first communications channel or the second communications channel,
      wherein said means for demodulating comprises means for coherently demodulating the received communications signal if the received communications signal is received on the first communications channel and for non-coherently demodulating the received communications signal if the received communications signal is received on the first communications channel.

35. An apparatus according to claim 19, wherein said means for determining and said means for communicating are positioned at one of a base station or a mobile terminal.

36. A method of communicating in a wireless communications system, the method comprising the steps of:
   determining a measure of quality of communications for a first communications channel that has a first redundancy level and that uses a modulation constellation; and
   communicating over a second communications channel if the determined measure of quality of communications meets a predetermined criterion, wherein the second communications channel employs an error correction encoding that provides a second redundancy level greater than the first redundancy level and that constrains modulation on the second communications channel to a subset of the modulation constellation used by the first communications channel.

37. A method according to claim 36:
   wherein said step of communicating over a second communications channel is preceded by the step of providing a modulator that is operative to modulate information communicated over the first communications channel according to the modulation constellation; and
   wherein said step of communicating over a second communications channel comprises the steps of:
      error correction encoding information to be transmitted on the second communications channel according to an error correction code;
      modulating the error correction encoded information in the modulator such that the error correction code constrains operation of the modulator to the subset of the modulation constellation; and
      transmitting the modulated error correction encoded information.

38. A method according to claim 36, wherein signals transmitted over the first communications channel are amenable to coherent demodulation, and wherein signals transmitted over the second communications channel are amenable to noncoherent demodulation.

39. A method according to claim 36, wherein said step of communicating over the second communications channel comprises communicating over the second communications channel if an attempt to communicate over the first communications channel fails.

40. A method according to claim 36, wherein the first communications channel comprises a first control channel and wherein the second communications channel comprises a second control channel.

41. A method according to claim 36, wherein the wireless communications system comprises a time division multiple access (TDMA) communications system operative to communicate information over a plurality of carrier frequency bands during a plurality of predetermined time slots, and wherein the first communications channel and the second communications channel use different time slots of a common carrier frequency band.

42. A method according to claim 36, wherein said step of communicating over the second communications channel comprises the step of transmitting on the second communications channel based on the determined measure of communications quality.

43. A method according to claim 36, wherein said step of communicating over the second communications channel comprises the step of receiving on the second communications channel based on the determined measure of communications quality.

44. A method according to claim 36, wherein said step of determining and said step of communicating over the second communications channel are performed at at least one of a base station and a mobile terminal.

45. A wireless communications system, comprising:
  means for determining a measure of quality of communications for a first communications channel that has a first redundancy level and that uses a modulation constellation; and
  means, responsive to said means for determining, for communicating over a second communications channel if the determined measure of quality of communications meets a predetermined criterion, wherein the second communications channel employs an additional error correction encoding that provides a second redundancy level greater than the first redundancy level and that constrains modulation on the second communications channel to a subset of the modulation constellation used by the first communications channel.

46. A system according to claim 45, comprising a modulator that modulates information transmitted on the first communications channel and the second communications channel, wherein said modulator applies the modulation constellation to information transmitted on the first communications channel, and wherein said means for communicating over a second communications channel comprises an error correction encoder that encodes information to be transmitted on the second communications channel according to an error correction code such that operation of the modulator for information transmitted over the second is constrained to the subset of the modulation constellation.

47. A system according to claim 45, comprising means for transmitting signals on the first communications channel that are amenable to coherent demodulation, and means for transmitting signals over the second communications channel that are amenable to noncoherent demodulation.

48. A system according to claim 45, wherein said means for communicating over the second communications channel comprises means for communicating over the second communications channel if an attempt to communicate over the first communications channel fails.

49. A system according to claim 45, wherein the first communications channel comprises a first control channel and wherein the second communications channel comprises a second control channel.

50. A system according to claim 45, wherein the first communications channel and the second communications channel use different time slots of a common carrier frequency band.

51. A system according to claim 45, wherein said means for communicating over the second communications channel comprises means for transmitting on the second communications channel based on the determined measure of communications quality.

52. A system according to claim 45, wherein said means for communicating over the second communications channel comprises means for receiving on the second communications channel based on the determined measure of communications quality.

53. A system according to claim 45, wherein said means for determining and said means for communicating over the second communications channel are positioned at at least one of a base station and a mobile terminal.

* * * * *

UNITED STATES PATENT AND TRADEMARK OFFICE
CERTIFICATE OF CORRECTION

PATENT NO. : 6,320,843 B1
DATED : November 20, 2001
INVENTOR(S) : Rydbeck et al.

It is certified that error appears in the above-identified patent and that said Letters Patent is hereby corrected as shown below:

<u>Column 18,</u>
Line 8, please change "receded" to -- preceded --.

<u>Column 19,</u>
Line 65, please change "comes" to -- comprises --.

Signed and Sealed this

Twenty-fourth Day of February, 2004

JON W. DUDAS
*Acting Director of the United States Patent and Trademark Office*